Patented June 22, 1954

2,681,929

UNITED STATES PATENT OFFICE 2,681,929

ARYL AND ARALKYL DERIVATIVES OF DIALKYLAMINOALKYLUREAS

John W. Cusic, Skokie, Ill., assignor to G. D. Searle & Co., Chicago, Ill., a corporation of Illinois No Drawing. Application August 5, 1950,
Serial No. 177,961

11 Claims. (Cl. 260—553)

The present invention relates to new groups of urea derivatives and more particularly to compounds of the general structural formula

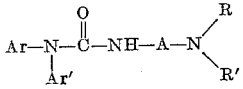

and salts thereof, wherein A is a bivalent saturated aliphatic hydrocarbon radical. Ar is an aryl group and Ar' is a member of the class consisting of aryl and aralkyl radicals, and R and R' are lower alkyl radicals.

In the foregoing structural formula the radical A represents a bivalent, saturated, aliphatic hydrocarbon radical, derived from straight chains or branch chains of hydrocarbons and includes such radicals as methylene, ethylene, propylene, butylene, amylene, hexylene and polymethylene radicals such as trimethylene, tetramethylene, pentamethylene and hexamethylene. Ar represents an aryl group such as phenyl, halophenyl, alkylphenyl, alkoxyphenyl, nitrophenyl and the like. Ar' is a member of the class consisting of aryl groups of the aforementioned type and aralkyl groups such as benzyl, phenethyl, halobenzyl, alkylbenzyl, alkoxybenzyl and the like.

Among the radicals which R and R' may represent are such lower alkyl groups as methyl, ethyl, propyl, butyl, amyl, and hexyl, wherein the propyl, butyl, amyl and hexyl groups may be either of the straight chain or branched chain type.

The organic bases of the foregoing type form salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide; phenethyl bromide, naphthylmethyl chloride, dimethyl sulfate, diethyl sulfate, methyl benzene sulfonate, ethyl toluene sulfonate, ethylene chlorohydrin, propylene chlorohydrin, allyl bromide, methallyl bromide and crotyl bromide.

The object of this invention is to provide novel chemical composition of the types indicated above. These urea derivatives are valuable intermediates in organic synthesis. Some of them have been found to possess a number of highly useful pharmacodynamic properties. Thus the ureas described have a pronounced effect on the circulatory system and a diuretic effect on the excretory function of the kidney. The described quaternary salts act as sympathicolytics and parasympathicolytics and produce ganglion block.

In the preparation of these compounds I prefer to heat a carbamyl chloride of the type

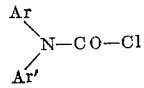

with a N,N-dialkylalkylenediamine of the type

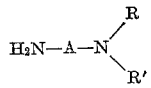

all symbols being of the class defined hereinabove, suitably in an anhydrous organic solvent in which all the starting materials are soluble.

My invention will be described more fully in conjunction with the following examples. It should be understood, however, that these examples are given by way of illustration only and that the invention is not to be construed as limited in spirit or in scope by the details set forth. It will be apparent to those skilled in the art that many modifications in materials and methods may be made without departing from the invention. In each of these examples, temperatures are given uncorrected in degrees centigrade (° C.) and amounts of materials in part by weight.

EXAMPLE 1

*1,1-diphenyl-3-(β-dimethylaminoethyl) urea*

A solution of 353 parts of N,N-dimethylethylenediamine in 2400 parts of butanone is mixed with 462 parts of diphenylcarbamyl chloride. A vigorous reaction occurs and a solid mass forms. After heating at refluxing temperature for 12 hours, the solvents are evaporated, and dilute hydrochloric acid and toluene is added. Upon warming the entire mass enters into solution. The hydrochloric acid layer is rendered alkaline by addition of dilute sodium hydroxide. It is then extracted with ether and the ether solution is dried over anhydrous potassium carbonate, filtered and evaporated. The solid residue is recrystallized first from petroleum ether and then from dilute isopropanol. It is dissolved in ether and treated with a 25% solution of hydrogen chloride in isopropanol. The 1,1-diphenyl-3-(β-dimethylaminoethyl) urea hydrochloride melts at about 221–222° C.

EXAMPLE 2

*Diphenylcarbamidoethyltrimethylammonium iodide*

100 parts of 1,1-diphenyl-3-(β-dimethylaminoethyl)urea are reacted with 228 parts of methyl iodide in 4000 parts of butanone in a shielded pressure reactor. A solid precipitate forms at once. After storage at 0° C. the crystals are filtered. The diphenylcarbamidoethyl-trimethylammonium iodide melts at about 240–241° C. This compound has the structural formula:

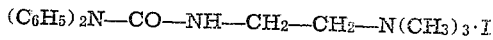

(C₆H₅)₂N—CO—NH—CH₂—CH₂—N(CH₃)₃·I

EXAMPLE 3

*1,1-diphenyl-3-(β-diethylaminoethyl)urea*

A solution of 696 parts of N,N-diethylethylenediamine in 2400 parts of butanone is reacted with 664 parts of diphenylcarbamyl chloride. After the exothermic reaction subsides the mixture is heated at refluxing temperature for 12 hours. The solvent is evaporated from the clear solution and ice, diluted hydrochloric acid and toluene are added to the residue. The hydrochloric acid layer is rendered alkaline by the addition of dilute sodium hydroxide and then extracted with ether. The ether layer is dried over anhydrous potassium carbonate, filtered and evaporated. The residue is dissolved in ether and treated with a 25% solution of hydrogen chloride in isopropanol. The sticky hydrochloride is recrystallized first from a mixture of isopropanol and ether and then from butanone. The 1,1-diphenyl-3-(β-diethylaminoethyl)urea hydrochloride melts at about 107–108° C. and has a tendency to become purple.

EXAMPLE 4

*Diphenylcarbamidoethyldiethylmethylammonium iodide*

100 parts of 1,1-diphenyl-3-(β-diethylaminoethyl)urea are mixed with 228 parts of methyl iodide in 4000 parts of butanone in a shielded pressure vessel. Upon storage at 0° C. a solid begins to appear within an hour. After several further hours of standing at 0° C. the diphenylcarbamidoethyldiethylmethylammonium iodide is collected on a filter. It melts at about 206–207° C. In order to convert this iodide into the citrate 3 moles of the iodide are treated with 1 mole of silver citrate and 2 moles of anhydrous citric acid in isopropanol solution. After stirring at room temperature, the silver iodide is filtered off. The filtrate is concentrated in vacuo and the dihydrogen citrate is washed with ether. The iodide has the formula (C₆H₅)₂N—CO—NH—CH₂—CH₂—N(C₂H₅)₂CH₃·I

EXAMPLE 5

*1,1-diphenyl-3-(γ-dimethylaminopropyl)urea*

A mixture of 695 parts of diphenylcarbamyl chloride and 306 parts of N,N-dimethyltrimethylenediamine in 5300 parts of benzene is heated at refluxing temperature for 12 hours. After thorough cooling the solid precipitate is collected on a filter and the filter cake recrystallized from isopropanol. The hydrochloride of 1,1-diphenyl-3-(γ-dimethylaminopropyl)urea melts at about 171–172° C.

EXAMPLE 6

*Diphenylcarbamidopropyltrimethylammonium iodide*

To a cooled solution of 140 parts of 1,1-diphenyl-3-(γ-dimethylaminopropyl)urea in 800 parts of butanone, 136 parts of methyl iodide are gradually added. A heavy, white precipitate forms within a short time. The diphenylcarbamidopropyltrimethylammonium iodide is recrystallized from dilute isopropanol and melts at about 197–198° C. It has the structural formula

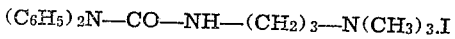

(C₆H₅)₂N—CO—NH—(CH₂)₃—N(CH₃)₃·I

EXAMPLE 7

*1,1-diphenyl-3-(γ-diethylaminopropyl)urea*

695 parts of diphenylcarbamyl chloride and 390 parts of N,N-diethyltrimethylenediamine in 4400 parts of benzene are mixed and maintained at refluxing temperature for 12 hours. After addition of dilute hydrochloric acid the aqueous layer is rendered alkaline by treatment with dilute sodium hydroxide and extracted with ether. The ether extract is dried over anhydrous potassium carbonate, filtered and evaporated. The citrate is prepared by treatment of a solution of 160 parts of the 1,1-diphenyl-3-(γ-diethylaminopropyl)urea in isopropanol with 96 parts of anhydrous citric acid. The citrate precipitates on cooling. After drying and recrystallizing from isopropanol it melts at about 81–83° C.

EXAMPLE 8

*1-benzyl-1-phenyl-3-(β-diethylaminoethyl)urea*

A mixture of 490 parts of benzylphenylcarbamyl chloride, prepared from benzylaniline and phosgene in dry ether, and N,N-diethylethylenediamine in 2400 parts of butanone is heated at refluxing temperature for 12 hours. The solvent is evaporated and dilute hydrochloric acid is added. The hydrochloric acid layer is rendered alkaline by addition of dilute sodium hydroxide and extracted with ether. The ether solution is dried over anhydrous potassium carbonate, filtered and evaporated. The hydrochloride is prepared by treatment with a 25% solution of hydrogen chloride in anhydrous isopropanol. After recrystallization from butanone the hydrochloride of 1-benzyl-1-phenyl-3-(β-diethylaminoethyl)urea melts at about 117–118° C.

EXAMPLE 9

*1-benzyl-1-phenyl-3-(β-diethylaminoethyl)urea methiodide*

100 parts of 1-benzyl-1-phenyl-3-(β-diethylaminoethyl)urea in 4000 parts of butanone are mixed with 228 parts of methyl iodide and maintained at 0° C. for 12 hours. The precipitate is collected on a filter. The 1-benzyl-1-phenyl-3-(β-diethylaminoethyl)urea methiodide melts at about 145–146° C. It has the structural formula

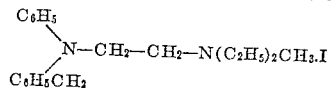

EXAMPLE 10

*1-benzyl-1-phenyl-3-(β-diethylaminoethyl)urea methobromide*

150 parts of 1-benzyl-1-phenyl-3-(β-diethylaminoethyl)urea in 4000 parts of butanone are treated with 173 parts of methyl bromide in a shielded pressure reactor. The mixture becomes warm and a solid precipitate forms within one half hour. After standing at 0° C. for 12 hours, the crystals are ground and collected on a filter. The 1-benzyl-1-phenyl-3-(β-diethylaminoethyl)-urea methobromide melts at about 133–136° C.

EXAMPLE 11

*1 - benzyl - 1 - phenyl - 3 - (γ - dimethylaminopropyl) urea*

915 parts of benzylaniline are reacted with 250 parts of phosgene and 7150 parts of dry ether with stirring in an ice bath. After standing for 12 hours, the mixture is filtered and the ether evaporated from the filtrate. 260 parts of N,N-dimethyltrimethylenediamine are added to the residue and heated at refluxing temperature. A heavy precipitate forms within a short time. After standing the precipitate is dissolved in water. The aqueous layer is made alkaline and extracted with ether. The ether extract is dried over anhydrous potassium carbonate, filtered and evaporated. The residue of 1-benzyl-1-phenyl-3-(γ-dimethylaminopropyl)urea is dissolved in ether and treated with a 25% solution of hydrogen chloride in isopropanol. The hydrochloride upon recrystallization from isopropanol melts at about 141–142° C.

EXAMPLE 12

*1 - (p - anisyl) - 1 - (p - nitrophenethyl) - 3 - (β-diisopropylaminoethyl) urea*

547 parts of N-(p-nitrophenethyl)-p-anisidine (cf. V. A. Izmail'skii and Z. M. Bairamov, "Journal of General Chemistry" 13, 693; 1943) are reacted with 100 parts of phosgene in 4000 parts of dry ether. After standing for 15 hours, the mixture is filtered and the ether evaporated in vacuo. 150 parts of N,N-diisopropylethylenediamine are added to the residue and heated at refluxing temperature for 12 hours. After addition of dilute hydrochloric acid the acid layer is separated, rendered alkaline by the addition of dilute sodium hydroxide and extracted with ether. The ether extract is dried over anhydrous potassium carbonate, filtered and evaporated. The residue consists of 1-(p-anisyl)-1-(p-nitrophenethyl)-3-(β-diisopropylaminoethyl) urea which has the structural formula

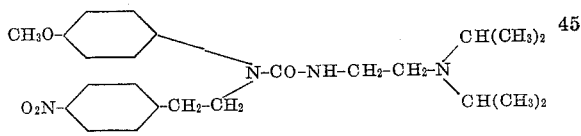

EXAMPLE 13

*1,3-dibenzyl-1-phenylcarbanilide*

A mixture of 245 parts of benzylphenylcarbamyl chloride and 183 parts of benzylaniline in 98 parts of pyridine and 2600 parts of benzene is heated at refluxing temperature for 12 hours. Dilute hydrochloric acid is added to the charge while it is still warm and complete solution occurs. The organic layer is separated and the solvents distilled therefrom in vacuo. The soft solid precipitate is collected on a filter. It melts at about 87–89° C.

I claim:

1. A compound of the class

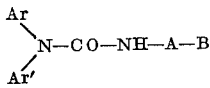

wherein Ar is an aryl radical of the class consisting of phenyl and methoxyphenyl radicals, Ar' is a member of the class consisting of phenyl and lower phenylalkyl radicals, A is a lower bivalent saturated aliphatic hydrocarbon separating the two nitrogen atoms attached thereto by at least two carbon atoms, and B is a lower dialkylamino radical.

2. A 1,1-diphenyl-3-dialkylaminoalkylurea of the structural formula

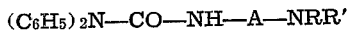

wherein A is a lower bivalent, saturated, aliphatic hydrocarbon radical separating the two nitrogen atoms attached thereto by at least two carbon atoms and R and R' are lower alkyl radicals.

3. A 1,1-diphenyl-3-(β-dialkylaminoethyl)urea of the structural formula

wherein R and R' are lower alkyl radicals.

4. A 1-phenyl-1-benzyl-3-dialkylaminoalkylurea of the following structural formula

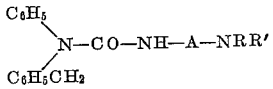

wherein A is a lower bivalent, saturated, aliphatic hydrocarbon radical separating the two nitrogen atoms attached thereto by at least two carbon atoms and R and R' are lower alkyl radicals.

5. A 1-phenyl-1-benzyl-3-dialkylaminoethyl-urea of the following structural formula

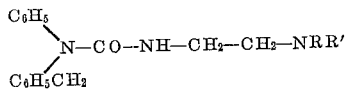

wherein R and R' are lower alkyl radicals.

6. 1,1 - diphenyl - 3 - (β - dimethylaminoethyl) urea.

7. A 1 - phenyl - 1 - (phenylalkyl) - 3 - dialkylaminoalkylurea of the following structural formula

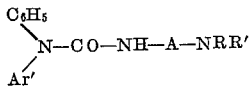

wherein Ar' is a lower phenylalkyl radical, A is a lower bivalent saturated aliphatic hydrocarbon separating the two nitrogen atoms attached thereto by at least two carbon atoms, and R and R' are lower alkyl radicals.

8. 1 - benzyl - 1 - phenyl - 3 - (β - diethylaminoethyl) urea.

9. 1,1 - diphenyl - 3 - (γ - dimethylaminopropyl) urea.

10. 1,1 - diphenyl - 3 - (γ - diethylaminopropyl) urea.

11. 1 - benzyl - 1 - phenyl - 3 - (γ - dimethylaminopropyl) urea.

References Cited in the file of this patent

UNITED STATES PATENTS

| Number | Name | Date |
|---|---|---|
| 2,050,557 | Bockmuhl et al. | Aug. 11, 1936 |
| 2,220,508 | Bock et al. | Nov. 5, 1940 |
| 2,253,773 | Engel et al. | Aug. 16, 1941 |

OTHER REFERENCES

Wenker, "J. Am. Chem. Soc.," vol. 60 (1938), pp. 158–159.